Aug. 30, 1932.   E. L. JACOBS   1,874,102
ARTIFICIAL BAIT
Filed Feb. 5, 1932
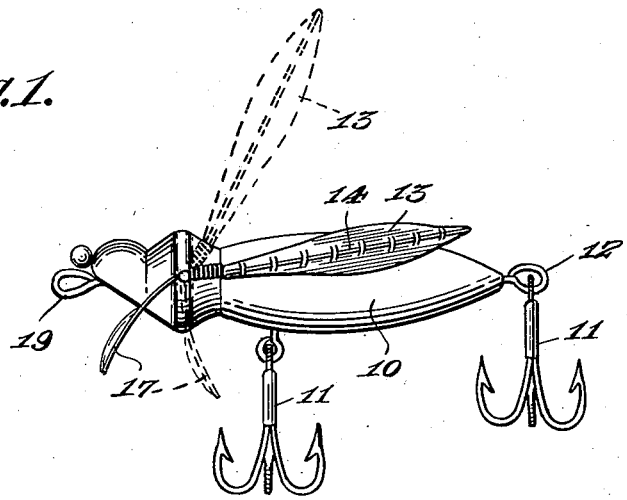
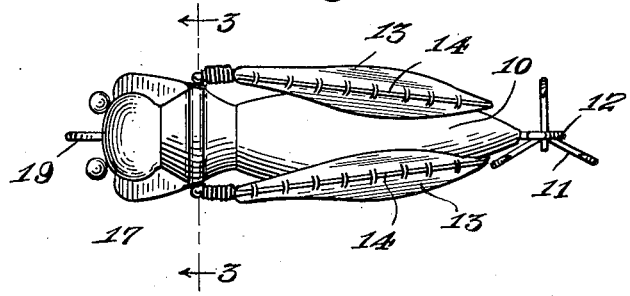
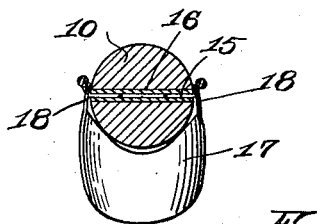

Patented Aug. 30, 1932

1,874,102

UNITED STATES PATENT OFFICE

EDWARD L. JACOBS, OF VICKSBURG, MICHIGAN

ARTIFICIAL BAIT

Application filed February 5, 1932. Serial No. 591,156.

The present invention comprehends the provision of an artificial bait simulating a live bait in the form of a fly or other winged insect, and constructed so that the wings thereof will be caused to rise and fall as the bait is drawn through the water.

In carrying out my invention I preferably connect the wings of the bait with a blade-like element in a manner, so that when the bait is subjected to short quick jerks as it is being drawn through the water, the wings will be caused to rise and fall, thereby simulating a live winged insect.

I also contemplate the provision of a bait of the above mentioned character which is light in weight, and simple in construction so that it can be cheaply manufactured and sold.

The nature and advantages of the invention will be better understood when the following detail description is read in connection with the accompanying drawing, the invention residing in the construction, combination and arrangement of parts as claimed.

In the drawing forming part of this application like numerals of reference indicate similar parts in the several views and wherein:

Figure 1 is a view in elevation illustrating one embodiment of the invention, and wherein the elevated position of the wings is shown by dotted lines.

Figure 2 is a top plan view.

Figure 3 is a sectional view on line 3—3 of Figure 2.

The bait forming the subject matter of the present invention can be constructed from any suitable light material, and may vary in size and form without departing from the inventive idea. The bait includes a body portion 10 of an outline to simulate a winged insect, and fish hooks 11 are attached thereto in any suitable manner. These hooks are preferably supported from eyes 12 which project from the body 10 and suitably located. The wings of the bait are indicated at 13 and may also be constructed from some light suitable material of any desired shape. These wings are preferably supported by rods 14 which are connected with a transverse pivot 15. The latter is passed through the body 10 of the bait adjacent the forward end thereof and through a suitable sleeve 16.

Connected with the wings 13 and depending therefrom beneath the body 10 is a blade-like element 17, the upper edge of which is suitably curved or shaped to conform to the cross sectional configuration of the body 10 to permit the blade to occupy either of the two positions illustrated by full and dotted lines in Figure 1. The blade is preferably formed with extensions 18 which are connected with the wings 13, so that movement of the blade imparts movement to the wings 13. The bait is connected to the line by means of an eye 19 located at the forward end thereof.

In practice the bait is adapted to be drawn through the water with sudden jerks to cause movement of the wings 13. In other words a sudden jerk on the bait will force the blade 17 from the position illustrated by full lines in Figure 1 to the position it occupies by dotted lines in the same figure, thereby causing the wings 13 to move upwardly to the position shown by dotted lines in Figure 1. Subsequent to each jerk on the bait, the wings 13 will gravitate to positions on top of the body 10, thereby moving the blade 17 to its foremost position. Obviously these movements of the wings afford the bait the appearance of a live winged insect which is very advantageous for the purpose intended.

While it is believed that from the foregoing description the nature and advantages of the invention will be readily apparent, I desire to have it understood that I do not limit myself to what is herein illustrated or described and that such changes may be resorted to when desired as fall within the scope of what is claimed.

What is claimed is:

1. An artificial bait simulating a live winged insect, comprising a body portion, wings pivoted at the sides thereof, and a blade directly connected with said wings adjacent the pivots therefor and depending from said body portion to cause said wings to rise and fall as the bait is drawn through the water with sudden jerks.

2. An artificial bait simulating a live winged insect, comprising a body portion, a pivot passed transversely through the forward end thereof, wings supported by said pivot, and a blade suspended from said wings beneath said body portion to cause said wings to rise and fall as the bait is drawn through the water with sudden jerks.

3. An artificial bait simulating a live winged insect, comprising a body portion, a pivot passed transversely through the forward end thereof, wings supported by said pivot and projecting rearwardly therefrom, and a blade suspended from said wings beneath the body and in advance of said pivot to cause said wings to rise and fall as the bait is drawn through the waer with sudden jerks.

In testimony whereof I affix my signature.

EDWARD L. JACOBS.